(12) United States Patent
Henkemeyer

(10) Patent No.: US 9,365,747 B2
(45) Date of Patent: Jun. 14, 2016

(54) PROTECTIVE PANEL REPAIR PATCH

(71) Applicant: Source One Tactical, Inc., Wellington, FL (US)

(72) Inventor: Jeffrey Henkemeyer, Rochester, MN (US)

(73) Assignee: Source One Tactical, Inc., Wellington, FL (US)

( * ) Notice: Subject to any disclaimer, the term of this patent is extended or adjusted under 35 U.S.C. 154(b) by 140 days.

(21) Appl. No.: 13/966,776

(22) Filed: Aug. 14, 2013

(65) Prior Publication Data

US 2014/0050875 A1   Feb. 20, 2014

Related U.S. Application Data

(60) Provisional application No. 61/683,159, filed on Aug. 14, 2012.

(51) Int. Cl.
*C09J 7/04* (2006.01)
*C09J 4/00* (2006.01)

(52) U.S. Cl.
CPC .... *C09J 7/04* (2013.01); *C09J 4/00* (2013.01); *C09J 7/045* (2013.01); *C09J 2400/263* (2013.01); *C09J 2433/00* (2013.01); *C09J 2467/006* (2013.01); *C09J 2477/006* (2013.01); *Y10T 428/14* (2015.01); *Y10T 428/1471* (2015.01)

(58) Field of Classification Search
CPC ............... C09J 7/04; C09J 7/045; C09J 4/00; C09J 2433/00; C09J 2467/006; C09J 2477/006; C09J 2400/263; Y10T 428/1471; Y10T 428/14

See application file for complete search history.

(56) References Cited

U.S. PATENT DOCUMENTS

| | | | | |
|---|---|---|---|---|
| 3,770,559 | A * | 11/1973 | Jackson | C09J 7/0296 428/213 |
| 5,284,891 | A * | 2/1994 | Wouters et al. | 524/522 |
| 5,633,070 | A * | 5/1997 | Murayama et al. | 428/194 |
| 5,958,526 | A * | 9/1999 | Spickelmire | 428/17 |
| 5,976,565 | A * | 11/1999 | Fotinos | 424/448 |
| 6,495,229 | B1 * | 12/2002 | Carte et al. | 428/40.1 |
| 6,550,474 | B1 * | 4/2003 | Anderson et al. | 128/200.24 |
| 2003/0068457 | A1 * | 4/2003 | McCain | 428/40.1 |
| 2005/0136266 | A1 * | 6/2005 | Zhou et al. | 428/447 |
| 2007/0014957 | A1 * | 1/2007 | Sislin et al. | 428/40.1 |
| 2007/0212520 | A1 * | 9/2007 | Furumori et al. | 428/134 |
| 2009/0223622 | A1 * | 9/2009 | Llano | 156/94 |
| 2010/0021670 | A1 * | 1/2010 | Llano | 428/41.7 |

* cited by examiner

*Primary Examiner* — Patricia L Nordmeyer
(74) *Attorney, Agent, or Firm* — Brian J. Colandreo, Esq.; Michael T. Abramson, Esq.; Holland & Knight LLP

(57) ABSTRACT

A spall cover repair patch includes a flexible substrate. A pressure sensitive adhesive is configured to adhere to a spall cover of protective panel. A release liner is configured to protect the pressure sensitive adhesive prior to use and releasably engage the pressure sensitive adhesive.

22 Claims, 3 Drawing Sheets

PROTECTIVE PANEL REPAIR PATCH

RELATED APPLICATIONS

This application claims the benefit of U.S. Provisional Patent Application Ser. No. 61/683,159, filed 14 Aug. 2012, its entire contents of which are incorporated herein by reference.

TECHNICAL FIELD

This disclosure relates to repair patches and, more particularly, to repair patches for use on protective panels.

BACKGROUND

Body armor is worn by military, law enforcement and security personnel throughout the world. This personal protective equipment is designed to stop small arms ammunition fired from a gun/weapon and to protect against flying shrapnel, which may often result in bodily injury/death. Protecting the body from larger caliber/higher velocity weapons may be accomplished through the use of ceramic, steel, layered polyethylene protective panels (or a combination thereof). These protective panels are then inserted into a vest or carrier that is worn by the end-user. However, due to their construction, these protective panels are sensitive to wear, dropping, and exposure to various contaminants (e.g., water, petroleum, oils, lubricants, fungus, DEET and other environmental debris).

Accordingly, a protective covering (commonly referred to as a "spall cover") envelops/encapsulates the protective panel, protecting it from degradation that would negatively impact the protective properties of the panel. Such spall covers are typically constructed using woven/nonwoven/knit materials (e.g., textiles or polymers) that are applied using heat activated adhesives/glues (or other thermals sealing methodologies) to enclose the protective panel. Accordingly, it is important that the spall cover remains intact to enclose and protect the protective panel.

As the protective panel is used, the degradation of the spall cover is often indicated through fraying, abrasion, rips and/or tears of the spall cover. After such wear to the spall cover, the protective panel should be inspected to ensure the integrity of the protective panel. Once this inspection is completed, the spall cover may be repaired or replaced in its entirety through a costly, labor-intensive process that often requires shipping the protective panel to a remote location.

SUMMARY OF DISCLOSURE

In one configuration, a spall cover repair patch includes a flexible substrate. A pressure sensitive adhesive is configured to adhere to a spall cover of protective panel. A release liner is configured to protect the pressure sensitive adhesive prior to use and releasably engage the pressure sensitive adhesive.

One or more of the following features may be included. The flexible substrate may be constructed of a textile material. The textile material may have a weight in the range of 3-5 ounces per square yard. The textile material may be one of a nylon material and a polyester material. The pressure sensitive adhesive may include an acrylic adhesive and a tackifying resin. The pressure sensitive adhesive may include 65-75% acrylic adhesive and 25-35% tackifying resin.

The pressure sensitive adhesive may be applied using a direct knife application process. The pressure sensitive adhesive may be applied using a thermo-coating process. The pressure sensitive adhesive may first be applied to the release liner to form an adhesive-covered release liner and the adhesive-covered release liner may then be applied to the flexible substrate.

The pressure sensitive adhesive may be a >5 mil thick adhesive layer. The release liner may be a silicon-coated paper. The flexible substrate may include one or more relief notches configured to allow for enhanced flexibility.

In another implementation, a spall cover repair patch includes a flexible substrate, wherein the flexible substrate is constructed of a textile material. A pressure sensitive adhesive is configured to adhere to a spall cover of protective panel, wherein the pressure sensitive adhesive includes an acrylic adhesive and a tackifying resin. A release liner is configured to protect the pressure sensitive adhesive prior to use and releasably engage the pressure sensitive adhesive.

One or more of the following features may be included. The textile material may have a weight in the range of 3-5 ounces per square yard. The textile material may be one of a nylon material and a polyester material. The pressure sensitive adhesive may include 65-75% acrylic adhesive and 25-35% tackifying resin.

In another implementation, a spall cover repair patch includes a flexible substrate, wherein the flexible substrate is constructed of a textile material, includes one or more relief notches configured to allow for enhanced flexibility, and has a weight in the range of 3-5 ounces per square yard. A pressure sensitive adhesive is configured to adhere to a spall cover of protective panel, wherein the pressure sensitive adhesive includes an acrylic adhesive and a tackifying resin. A release liner is configured to protect the pressure sensitive adhesive prior to use and releasably engage the pressure sensitive adhesive.

One or more of the following features may be included. The textile material may be one of a nylon material and a polyester material. The pressure sensitive adhesive may include 65-75% acrylic adhesive and 25-35% tackifying resin. The release liner may be a silicon-coated paper.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
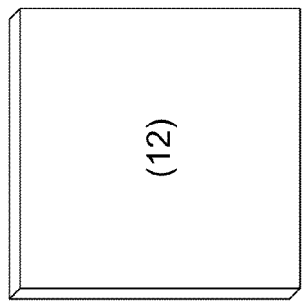
FIG. 1 is a diagrammatic view of body armor.
Figure 1:
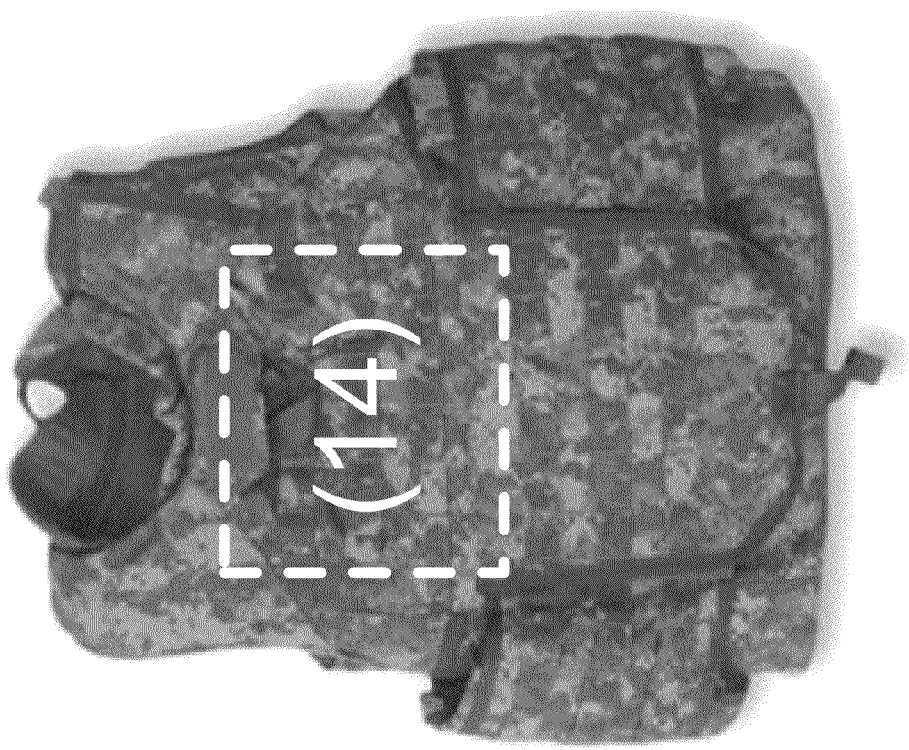

Overview:

In FIG. 1, there is body armor 10. Body armor 10 is personal armor that is designed to absorb the impact of various objects, such as bullets (shot from firearms) and shrapnel (produced by explosions). While typically configured to provide protection to the torso of the wearer, other configurations are possible that may provide protection to the head and the lower extremities (e.g., groin and legs).

Soft body armor may be made from multiple layers of woven or laminated fibers and may be configured to protect the wearer from small-caliber handgun bullets, shotgun projectiles (pellets and slugs), and smaller fragments from explosive devices (such as fragmenting hand grenades). Additionally, body armor 10 may be configured to receive protective panels (e.g., protective panel 12) within various pouches/pockets (e.g., pocket 14) included within body armor 10. These protective panels may be positioned to protect various internal organs of the wearer. Protective panel 12 may be constructed of various types of material, including but not limited to metal and ceramic.

While metal protective panels (such as ½" plate steel) provide a high level of protection against traditional assault weapon rounds (e.g., the 5.56 mm×45 mm round used in the AR platform and the 7.62×39 mm round used in the AK platform) and have low maintenance requirements, such metal protective panels tend to be prohibitively heavy. Conversely, while ceramic protective panels tend to be much lighter than metal panels, ceramic panels require a level of inspection and maintenance.

As discussed above, due to the construction of ceramic protective panels, such protective panels are sensitive to wear, damage from being dropped, damage from being struck by a projectile, and exposure to various contaminants (e.g., water, petroleum, oils, lubricants, fungus, DEET and other environmental debris).

Figure 2:
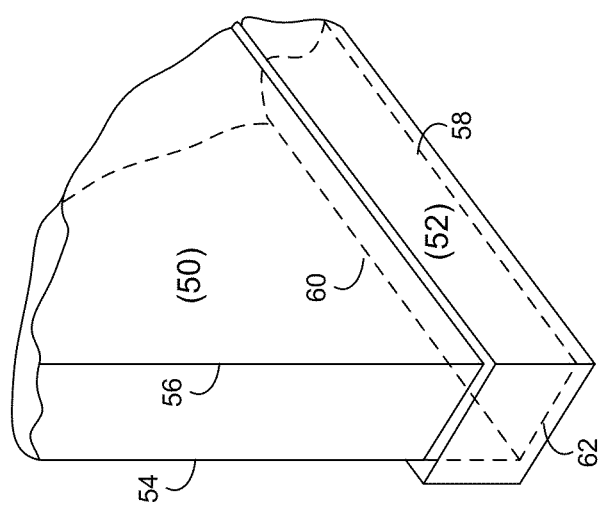
FIG. 2 is diagrammatic view of a ceramic protective panel for insertion in the body armor of FIG. 1.

Referring also to FIG. 2, there is shown ceramic protective panel 50. As discussed above, ceramic protective panel 50 may be encapsulated by spall cover 52 (shown partially removed to expose ceramic protective panel 50). As discussed above, in a typical configuration, spall cover 52 would be configured to envelop/encapsulate ceramic protective panel 50 and protect ceramic protective panel 50 from degrading due to exposure to the above-described contaminants. As discussed above, spall cover 52 may be constructed using various types of materials (e.g., woven materials, nonwoven materials, knit materials) that may be applied using heat activated adhesives/glues (or other thermal sealing methodologies).

Unfortunately and during normal use, spall cover 52 may be damaged during normal use and not through e.g., being struck by a projectile that may crack/shatter ceramic protective panel 50. For example and through normal wear and tear, spall cover 52 may wear away proximate the edges (e.g., edges 54, 56, 58, 60, 62) of ceramic protective panel 50, thus exposing ceramic protective panel 50 to the above-described contaminants. For example, spall cover 52 may wear away due to abrasive contact with body armor 10.

Figure 3:
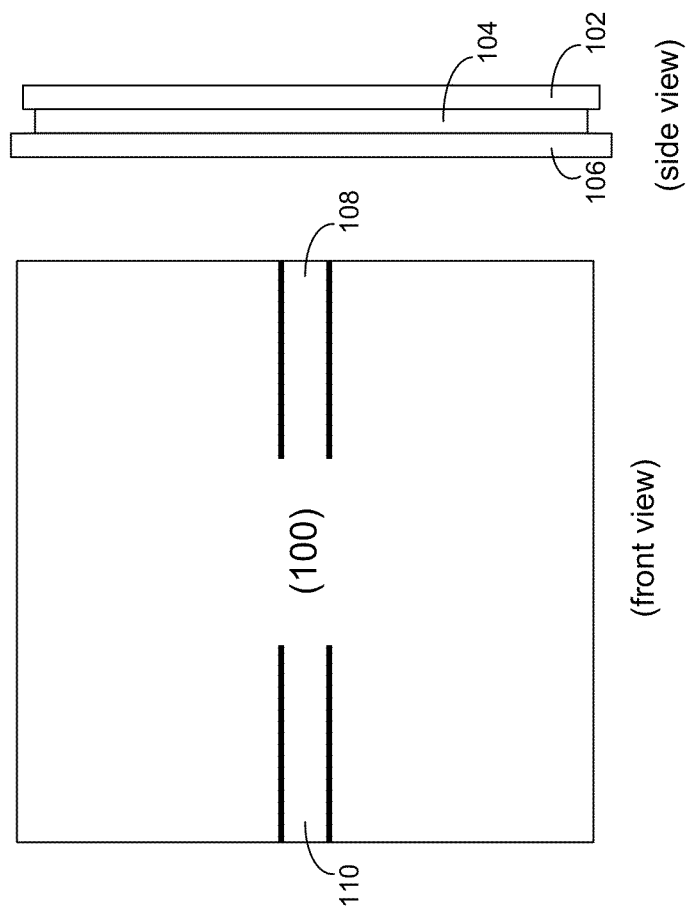
FIG. 3 is a diagrammatic view of a spall cover repair patch according to an implementation of the present disclosure.

Referring also to FIG. 3, there is shown spall cover repair patch 100. Spall cover repair patch 100 may be configured to be applied to spall cover 52 and allow the wearer to repair defects in spall cover 52 that occurred due to: e.g., spall cover 52 wearing through at various locations (e.g., edges) of ceramic protective panel 50 and/or e.g., spall cover 52 being damaged due to shrapnel/projectiles striking (but not cracking/shattering) ceramic protective panel 50.

Spall cover repair patch 100 may include flexible substrate 102; pressure sensitive adhesive 104 configured to adhere to spall cover 52 of protective ceramic panel 50; and release liner 106 configured to protect pressure sensitive adhesive 104 prior to use and releasably engage pressure sensitive adhesive 104.

Flexible Substrate 102:

Flexible substrate 102 may be constructed of a textile material (e.g., having a weight in the range of 3-5 ounces per square yard), such as a woven/knit nylon or polyester material. Alternatively, a natural material (such as cotton) may be used. Flexible substrate 102 may be configured to be sufficiently flexible to allow it to be bent/manipulated is such a way as to cover the damaged portion of spall cover 52. However, it may be desirable to maintain flexible substrate 102 as rigid as possible to provide a higher level of durability. Accordingly, in the event that ceramic protective panel 50 has rounded corners, flexible substrate 102 may need to be less flexible (due to the rounded corners). However, in the event that ceramic protective panel 50 has harder 90 degree corners, flexible substrate 102 may need to be more flexible.

Figure 4:
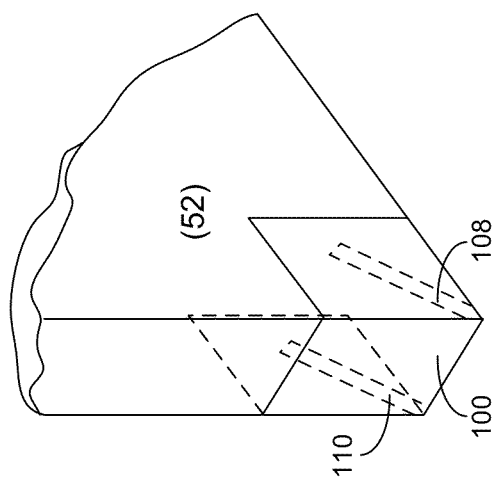
FIG. 4 is a diagrammatic view of the spall cover repair patch of FIG. 3 applied to the ceramic protective panel of FIG. 2.

Flexible substrate 102 may include one or more relief notches (e.g., relief notches 108, 110) that may be configured to allow for enhanced flexibility of spall cover repair patch 100. For example and through the use of relief notches 108, 110, spall cover repair patch 100 may be manipulated to repair spall cover 52 at a point at which three orthogonal surfaces meet (e.g., when configured where one surface is in the X-plane, one surface is in the Y-plane, and one surface is in the Z-plane (as shown in FIG. 4).

Flexible substrate 102 may be coated with a material (e.g., a polyurethane acrylic barrier) that may be configured to prevent penetration of the above-described contaminants through flexible substrate 102. Additionally, flexible substrate 102 may be configured to provide a suitable level of abrasion resistance, such as that defined within ASTM 3884 H18 wheel with a 1,000 gram load.

Pressure Sensitive Adhesive 104:

Pressure sensitive adhesive 104 may include an acrylic adhesive and a tackifying resin. For example, pressure sensitive adhesive 104 may be configured so that it includes 65-75% acrylic adhesive and 25-35% tackifying resin. Pressure sensitive adhesive 104 may be a 5+ mil thick adhesive layer that may be configured to adhere to spall cover 52 without the need for: e.g., the application of heat, any special tools, or any special surface preparation.

Pressure sensitive adhesive 104 may be applied in various methodologies, such as using a direct knife application process (e.g., direct transfer, knife over roll; direct transfer, knife over web on the roll; or direct transfer, knife over the web), a thermo-coating process (e.g., via a heat activated liquid or dry coating process), a liquid coating process, solvent coating process, a calendaring process, a hot melt coating process, and/or any other suitable process for application of a pressure sensitive adhesive to a substrate.

Release Liner 106:

Release liner 106 may be a silicon-coated paper that may be configured to be removable from pressure sensitive adhesive 104 without the need for special tools and/or procedures. Additionally, when assembling spall cover repair patch 100, pressure sensitive adhesive 104 may first be applied to release liner 106 to form an adhesive-covered release liner, and this adhesive-covered release liner may then be applied to flexible substrate 102.

Having thus described the disclosure of the present application in detail and by reference to embodiments thereof, it will be apparent that modifications and variations are possible without departing from the scope of the disclosure defined in the appended claims.

What is claimed is:

1. A spall cover repair patch comprising:
   a flexible substrate, wherein the flexible substrate is coated continuously with a liquid, debris, and moisture material barrier, and coated continuously with a pressure sensitive adhesive, to prevent degradation of a protective panel, wherein the flexible substrate includes one or more relief notches configured to allow for enhanced flexibility for application to a corner angle of the spall cover of protective panel, wherein the one or more relief notches include one or more notches on an edge of the flexible substrate extending towards the center of the flexible substrate;

the pressure sensitive adhesive configured to adhere to a spall cover of protective panel, wherein the pressure sensitive adhesive is further configured to adhere to a damaged portion of the spall cover of protective panel; and a release liner configured to protect the pressure sensitive adhesive prior to use and releasably engage the pressure sensitive adhesive, wherein the flexible substrate coated continuously with the liquid, debris, and moisture material barrier, when adhered to the damaged portion of the spall cover of protective panel by the pressure sensitive adhesive, prevents degradation of the protective panel encapsulated by the spall cover of protective panel via the damaged portion.

2. The spall cover repair patch of claim 1 wherein the flexible substrate is constructed of a textile material.

3. The spall cover repair patch of claim 2 wherein the textile material has a weight in the range of 3-5 ounces per square yard.

4. The spall cover repair patch of claim 2 wherein the textile material is one of:
   a nylon material; and
   a polyester material.

5. The spall cover repair patch of claim 1 wherein the pressure sensitive adhesive includes: an acrylic adhesive; and a tackifying resin.

6. The spall cover repair patch of claim 5 wherein the pressure sensitive adhesive includes:
   65-75% acrylic adhesive; and
   25-35% tackifying resin.

7. The spall cover repair patch of claim 1 wherein the pressure sensitive adhesive for coating continuously the pressure sensitive adhesive is applied using a direct knife application process.

8. The spall cover repair patch of claim 1 wherein the pressure sensitive adhesive is applied using a thermo-coating process.

9. The spall cover repair patch of claim 1 wherein the pressure sensitive adhesive is first applied to the release liner to form a continuously coated adhesive-covered release liner and the continuously coated adhesive-covered release liner is then applied to the flexible substrate.

10. The spall cover repair patch of claim 1 wherein the pressure sensitive adhesive is a >5 mil thick adhesive layer.

11. The spall cover repair patch of claim 1 wherein the release liner is a silicon-coated paper.

12. The spall cover repair patch of claim 1 wherein the material includes a polyurethane acrylic barrier as the liquid, debris, and moisture material barrier.

13. A spall cover repair patch comprising:
   a flexible substrate, wherein the flexible substrate is coated continuously with a liquid, debris, and moisture material barrier, and coated continuously with a pressure sensitive adhesive, to prevent degradation of a protective panel, wherein the flexible substrate includes one or more relief notches configured to allow for enhanced flexibility for application to a corner angle of the spall cover of protective panel, wherein the one or more relief notches include one or more notches on an edge of the flexible substrate extending towards the center of the flexible substrate;

the pressure sensitive adhesive configured to adhere to a spall cover of protective panel, wherein the pressure sensitive adhesive is further configured to adhere to a damaged portion of the spall cover of protective panel, and wherein the pressure sensitive adhesive includes an acrylic adhesive and a tackifying resin; and a release liner configured to protect the pressure sensitive adhesive prior to use and releasably engage the pressure sensitive adhesive, wherein the flexible substrate coated continuously with the liquid, debris, and moisture material barrier, when adhered to the damaged portion of the spall cover of protective panel by the pressure sensitive adhesive, prevents degradation of the protective panel encapsulated by the spall cover of protective panel via the damaged portion.

14. The spall cover repair patch of claim 13 wherein the textile material has a weight in the range of 3-5 ounces per square yard.

15. The spall cover repair patch of claim 13 wherein the textile material is one of:
   a nylon material; and
   a polyester material.

16. The spall cover repair patch of claim 13 wherein the pressure sensitive adhesive includes:
   65-75% acrylic adhesive; and
   25-35% tackifying resin.

17. The spall cover repair patch of claim 13 wherein the material includes a polyurethane acrylic barrier as the liquid, debris, and moisture material barrier.

18. A spall cover repair patch comprising:
   a flexible substrate, wherein the flexible substrate is constructed of a textile material, includes one or more relief notches configured to allow for enhanced flexibility, and has a weight in the range of 3-5 ounces per square yard, wherein the flexible substrate is coated continuously with a liquid, debris, and moisture material barrier, and coated continuously with a pressure sensitive adhesive, wherein the one or more relief notches include one or more notches on an edge of the flexible substrate extending towards the center of the flexible substrate;

the pressure sensitive adhesive configured to adhere to a spall cover of protective panel, wherein the pressure sensitive adhesive is further configured to adhere to a damaged portion of the spall cover of protective panel, and wherein the pressure sensitive adhesive includes an acrylic adhesive and a tackifying resin; and a release liner configured to protect the pressure sensitive adhesive prior to use and releasably engage the pressure sensitive adhesive, wherein the flexible substrate coated continuously with the liquid, debris, and moisture material barrier, when adhered to the damaged portion of the spall cover of protective panel by the pressure sensitive adhesive, prevents degradation of the protective panel encapsulated by the spall cover of protective panel via the damaged portion.

19. The spall cover repair patch of claim 18 wherein the textile material is one of:
   a nylon material; and
   a polyester material.

20. The spall cover repair patch of claim 18 wherein the pressure sensitive adhesive includes:
   65-75% acrylic adhesive; and
   25-35% tackifying resin.

21. The spall cover repair patch of claim 18 wherein the release liner is a silicon-coated paper.

22. The spall cover repair patch of claim 18 wherein the material includes a polyurethane acrylic barrier as the liquid, debris, and moisture material barrier.

\* \* \* \* \*